United States Patent
Liu et al.

(10) Patent No.: US 10,116,785 B2
(45) Date of Patent: Oct. 30, 2018

(54) SYSTEM AND METHOD FOR SUPPORTING MOVABLE OBJECT APPLICATION DEVELOPMENT

(71) Applicant: SZ DJI TECHNOLOGY CO., LTD., Shenzhen (CN)

(72) Inventors: Weifeng Liu, Fremont, CA (US); Xiaojun Li, Shenzhen (CN); Caihua Zhao, Shenzhen (CN); Nanning Li, Shenzhen (CN); Changjian Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/349,487

(22) Filed: Nov. 11, 2016

(65) Prior Publication Data
US 2017/0064068 A1    Mar. 2, 2017

Related U.S. Application Data

(63) Continuation of application No. PCT/CN2015/076992, filed on Apr. 20, 2015.

(51) Int. Cl.
*H04W 4/00* (2018.01)
*H04M 1/725* (2006.01)
(Continued)

(52) U.S. Cl.
CPC ........ *H04M 1/72533* (2013.01); *H04L 9/088* (2013.01); *H04W 4/001* (2013.01);
(Continued)

(58) Field of Classification Search
CPC ....................................................... H04B 4/00
(Continued)

(56) References Cited

U.S. PATENT DOCUMENTS 7,463,890 B2 * 12/2008 Herz ............... H04L 45/00
    370/229
9,459,620 B1 * 10/2016 Schaffalitzky ....... G05D 1/0016
(Continued)

FOREIGN PATENT DOCUMENTS

CN          1815518        8/2006
CN         101592955      12/2009
(Continued)

OTHER PUBLICATIONS

International Search Report of the International Search Authority dated Jan. 21, 2016, issued by the State Intellectual Property Office of the P.R. China in counterpart International Application No. PCT/CN2015/076992; 5 pages.
(Continued)

*Primary Examiner* — Wen Huang
(74) *Attorney, Agent, or Firm* — Finnegan, Henderson, Farabow, Garrett & Dunner, LLP

(57) ABSTRACT

Systems and methods can support application development in a movable object environment. A movable object manager can establish a connection with a movable object, and receives one or more data packets from the movable object. Then, the movable object manager can provide information in said one or more data packets to an application on a user terminal.

36 Claims, 16 Drawing Sheets

(51) Int. Cl.
    *H04W 4/50*     (2018.01)
    *H04L 9/08*     (2006.01)
    *H04W 12/06*     (2009.01)
    *H04W 4/04*     (2009.01)
    *H04W 12/08*     (2009.01)

(52) U.S. Cl.
    CPC ............. *H04W 4/046* (2013.01); *H04W 4/50* (2018.02); *H04W 12/06* (2013.01); *H04W 12/08* (2013.01)

(58) Field of Classification Search
    USPC .............................................. 455/7, 11.1, 16
    See application file for complete search history.

(56) References Cited

U.S. PATENT DOCUMENTS

| | | | |
|---|---|---|---|
| 2005/0170829 A1* | 8/2005 | Seo | H04L 67/14 455/420 |
| 2006/0217152 A1* | 9/2006 | Fok | H01M 10/48 455/557 |
| 2006/0271248 A1* | 11/2006 | Cosgrove, Jr. | B64C 39/024 701/2 |
| 2009/0005167 A1* | 1/2009 | Arrasvuori | A63H 33/042 463/40 |
| 2011/0071707 A1* | 3/2011 | Crumm | B64C 39/024 701/3 |
| 2012/0276891 A1* | 11/2012 | Bai | G08C 17/02 455/420 |
| 2014/0073256 A1* | 3/2014 | Newham | H04M 1/6066 455/41.3 |
| 2014/0206289 A1* | 7/2014 | Rahman | H04W 4/001 455/41.2 |
| 2015/0014116 A1 | 1/2015 | Kimes et al. | |
| 2015/0067377 A1* | 3/2015 | Park | G06F 1/3212 713/340 |

FOREIGN PATENT DOCUMENTS

| | | |
|---|---|---|
| CN | 101866180 | 10/2010 |
| CN | 102354208 | 2/2012 |
| CN | 103246204 | 8/2013 |
| CN | 103914076 | 7/2014 |
| CN | 104243132 | 12/2014 |
| JP | 2014-505934 | 3/2014 |
| WO | WO 2015/014116 A1 | 2/2015 |

OTHER PUBLICATIONS

Written Opinion of the International Search Authority dated Jan. 21, 2016, issued by the State Intellectual Property Office of the P.R. China in counterpart International Application No. PCT/CN2015/076992; 6 pages.

Matsukura, R., "A service platform to monitor and control home appliances as Web resources", 2014 Information Processing Society of Japan, IPSJ SIC Technical Report, vol. 2014HCI-157 No. 48, vol. 2014-GN-91 No. 48, vol. 2014-BC-31 No. 48, 9 pages.

* cited by examiner

SYSTEM AND METHOD FOR SUPPORTING MOVABLE OBJECT APPLICATION DEVELOPMENT

CROSS-REFERENCE TO RELATED APPLICATIONS

This application is a continuation application of International Application No. PCT/CN2015/076992 filed on Apr. 20, 2015, the content of which is hereby incorporated by reference in its entirety.

BACKGROUND OF THE INVENTION

The disclosed embodiments relate generally to software application development and more particularly, but not exclusively, to developing applications for using movable objects.

The unmanned aircraft era is here. The unmanned aircraft may be used in many different fields, such as archeology study, sports events, disaster relief, and environmental protection, etc. The unmanned aircrafts as well as other movable objects, such as the unmanned vehicles, handheld devices, and robots, can provide a new direction and a unique view point for advancing the traditional industries.

This is the general area that embodiments of the invention are intended to address.

BRIEF SUMMARY OF THE INVENTION

Described herein are systems and methods that can support application development in a movable object environment. A movable object manager can establish a connection with a movable object, and receives one or more data packets from the movable object. Then, the movable object manager can provide information in said one or more data packets to an application on a user terminal.

Also described herein are systems and methods that can support application development in a movable object environment. An authentication server can receive an activation request from an application, wherein the activation request contains a request for a privilege to access a movable object. Then, the authentication server can apply one or more policies on the activation request, and grant the privilege, to access the movable object, to the application if the application is entitled.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses unmanned aircraft as example for movable objects. It will be apparent to those skilled in the art that other types of movable objects can be used without limitation.

An Exemplary Movable Object Environment

Figure 1:
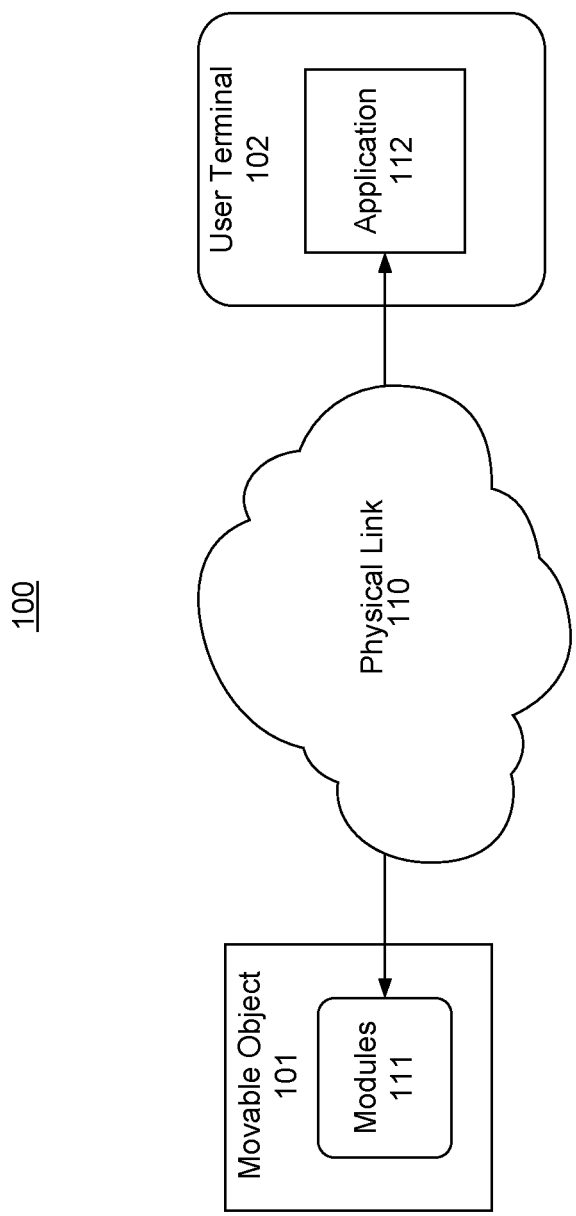
FIG. 1 is an exemplary illustration of an application in a movable object environment, in accordance with various embodiments of the present invention.

FIG. 1 is an exemplary illustration of an application in a movable object environment, in accordance with various embodiments of the present invention. As shown in FIG. 1, an application 112 in a movable object environment 100 can communicate with a movable object 101 via a physical link 110. The movable object 101 can be an unmanned aircraft, an unmanned vehicle, a handheld device, and/or a robot.

In accordance with various embodiments of the present invention, the movable object 101 can include various functional modules 111. For example, an unmanned aircraft can include a camera module, a battery module, a gimbal module a communication module, and a flight controller module, etc.

As shown in FIG. 1, the application 112 can be deployed on a user terminal 102. For example, the user terminal 102 can be a portable personal computing device, a smart phone, a remote control, and/or a personal computer.

Additionally, the user terminal 102 can include a communication device (not shown), which is responsible for handling the communication between the application 112 on the user terminal 102 and various modules 111 on the movable object 101. For example, an unmanned aircraft can include uplink and downlink. The uplink can be used for transmitting control signals, the down link can be used for transmitting media or video stream.

In accordance with various embodiments of the present invention, the physical link 110 can be (part of) a network, which is based on various wireless technologies, such as the WiFi, Bluetooth, 3G/4G, and other radio frequency technologies. Furthermore, the physical link 110 can be based on other computer network technologies, such as the internet technology.

Figure 2:
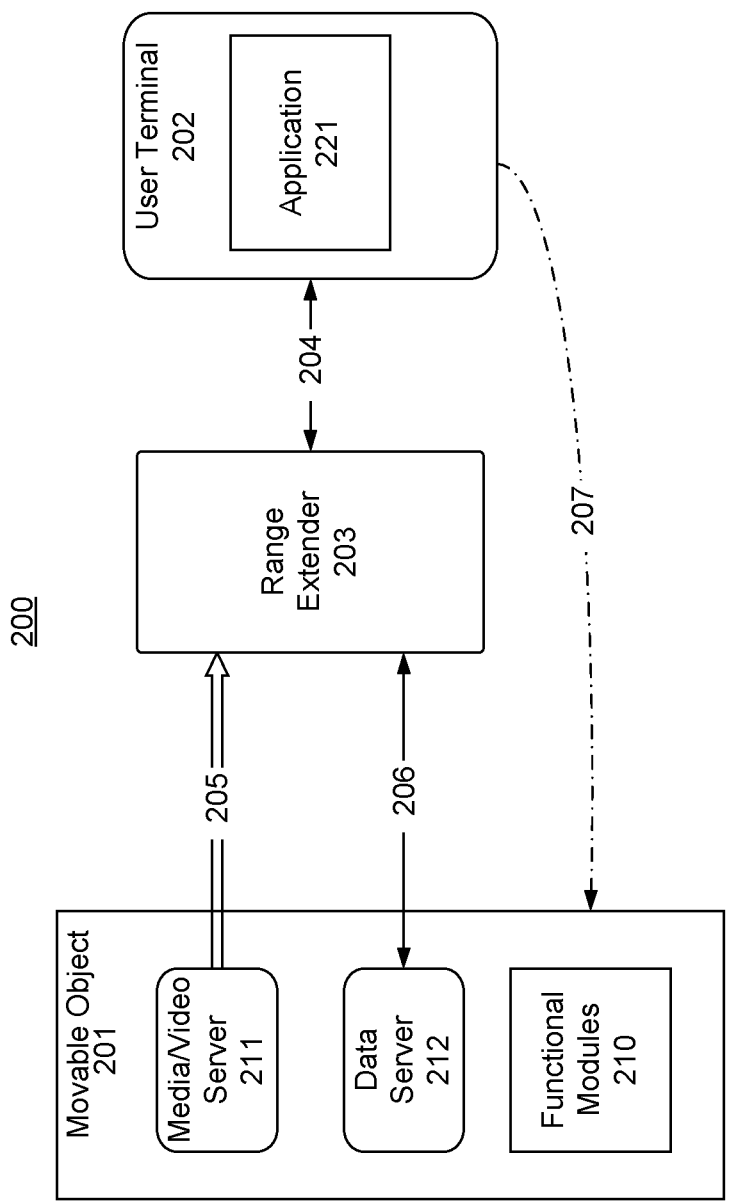
FIG. 2 is an exemplary illustration of using multiple data connections for supporting the communication between an application and a movable object, in accordance with various embodiments of the present invention.

FIG. 2 is an exemplary illustration of using multiple data connections for supporting the communication between an application and a movable object, in accordance with various embodiments of the present invention. As shown in FIG. 2, a communication device, such as a range extender 203 in a movable object environment 200, can be used for handling the communication between an application 221, which is deployed on a user terminal 202, and various functional modules 210 on a movable object 201. The movable object 201 can be an unmanned aircraft, an unmanned vehicle, a handheld device, and/or a robot.

In accordance with various embodiments of the present invention, the user terminal 202 can connect to the communication device, i.e. the range extender 203, via a wireless connection 204. Alternatively, the communication device can be connected with the user terminal 202 via a cable. Additionally, the user terminal 202 can communicate with the movable object 201 via a remote control (RC) connection 207.

Furthermore, the communication device 203 can communicate with the movable object 201 via multiple connections 205-206, which are used for transmitting different types of data packets.

As shown in FIG. 2, the movable object 201 includes a media/video server 211 and a data server 212, in addition to various functional modules 210. The media/video connection 205, which may be based on UCP protocols, can be used for transmitting media/video information from the media/video server 211 to the communication device 203 (e.g. a range extender). The data connection 206, which may be based on TCP protocols, can be used for transmitting data, such as the flight status information and the user commands, between the data server 212 and the communication device 203.

Additionally, the data connection 206 can transmit data both from the application 221 to the movable object 201 and from the data server 212 to the application 221 (i.e. for both the uplink and the downlink).

Figure 3:
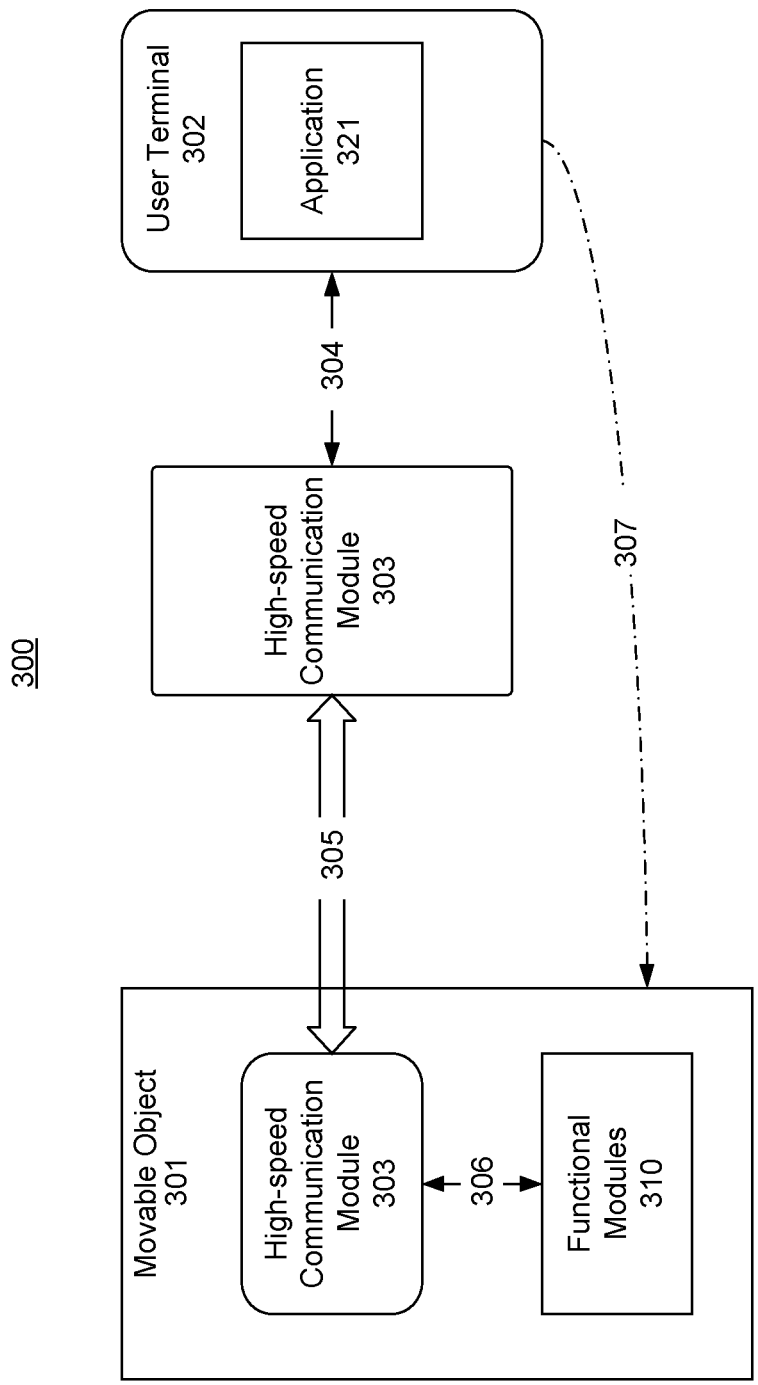
FIG. 3 is an exemplary illustration of using a high speed connection for supporting the communication between an application and a movable object, in accordance with various embodiments of the present invention.

FIG. 3 is an exemplary illustration of using a high speed connection for supporting the communication between an application and a movable object, in accordance with various embodiments of the present invention. As shown in FIG. 3, a communication device, such as a high speed communication module 303 in a movable object environment 300, can be used for handling the communication between an application 321, which is deployed on the user terminal 302, and various functional modules 310 on the movable object 301. The movable object 301 can be an unmanned aircraft, an unmanned vehicle, a handheld device, and/or a robot.

In accordance with various embodiments of the present invention, the high speed communication module 303 operates to communicate with the movable object 301 via a high speed connection 305, which can be used to transmit mixed types of data packets, such as the command information and the media/video streams. Also, the movable object 301, such as an unmanned aircraft, can use the high speed connection 305 for supporting both the uplink and the downlink. The uplink can be used to transmit control signals, the down link can be used to transmit media or video stream and various flight status information.

In accordance with various embodiments of the present invention, the user terminal 202 can connect to the high speed communication module 303 via a cable 304. Alternatively, the high speed communication module 303 can be connected with the user terminal 302 via a wireless connection. Additionally, the user terminal 302 can communicate with the movable object 301 via a remote control (RC) connection 307.

As shown in FIG. 3, the movable object 301 can include high speed communication module 311. The connection 305 between the high speed communication module 303 and the high speed communication module 311 can be based on a high speed communication protocol, e.g. such as various protocols based on the orthogonal frequency-division multiplexing (OFDM) technologies.

At real time, the high speed communication module 311 on the movable object 301 can collect information from the different functional modules 310 of the movable object 301, in a parallel fashion. Then, the high speed communication module 311 can convert the received data into a serial format, which can be transmitted through the connection 305. When the data packets reaches the high speed communication module 303, the high speed communication module 303 can convert the data from the serial format into a parallel format.

On the other hand, when the high speed communication module 303 receives the various commands from the application 321, the high speed communication module 303 can transmit these commands to the high speed communication module 311 in a serial format. When the data packets reaches the high speed communication module 311, the high speed communication module 311 can convert the data from a serial format into a parallel format, and distribute the data to various modules 310 on the movable object 301 in a parallel fashion.

A Movable Object Manager

Figure 4:
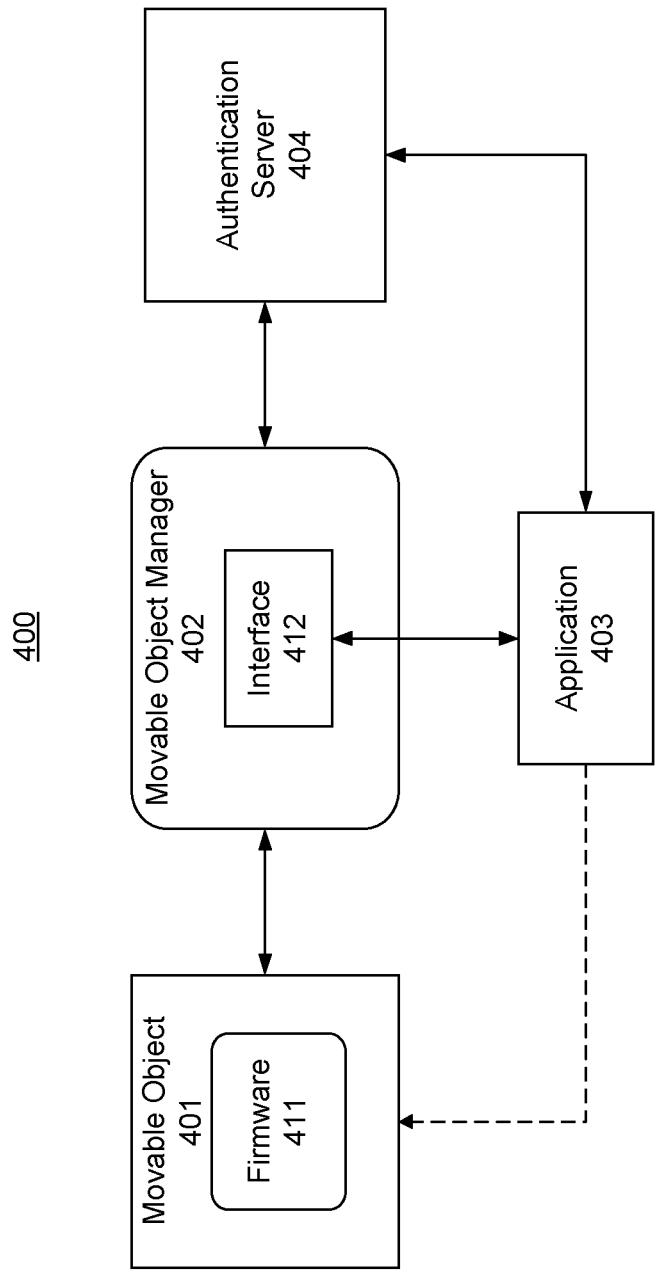
FIG. 4 is an exemplary illustration of supporting software application development in a movable object environment, in accordance with various embodiments of the present invention.

FIG. 4 is an exemplary illustration of supporting software application development in a movable object environment, in accordance with various embodiments of the present invention. As shown in FIG. 4, an application 403 in a movable object environment 400 can use a movable object manager 402 for accessing and controlling a movable object 401, which uses the firmware 411 for controlling various functional modules. The movable object 401 can be an unmanned aircraft, an unmanned vehicle, a portable computing device, a hand-held device or a robot.

In accordance with various embodiments of the present invention, the movable object manager 402 can be part of a software development kit (SDK), which is used for supporting the development of software applications in the movable object environment 400.

As shown in FIG. 4, the movable object manager 402 can establish a connection with the movable object 401 and manages the communication between the application 403 and the movable object 401.

For example, the movable object manager 402 can receive one or more data packets from the movable object 401. Then, the movable object manager 402 can provide the information in said one or more data packets to the application 403. Also, the movable object manager 402 can receive one or more commands from the application, and send the one or more commands to the movable object 401.

In accordance with various embodiments of the present invention, the movable object manager 402 is accessible by the application 403 via an interface 412.

Additionally, the movable object manager 402 may be configured to locate at different places in the movable object environment 400. For example, the movable object manager 402 may reside on a user terminal where the application 403 is deployed. Alternatively, the movable object manager 402 may reside on a remote server, a communication device, or on the movable object 401.

Furthermore, an authentication server 404 can be used for providing a security model for supporting the application development in the movable object environment 400.

Figure 5:
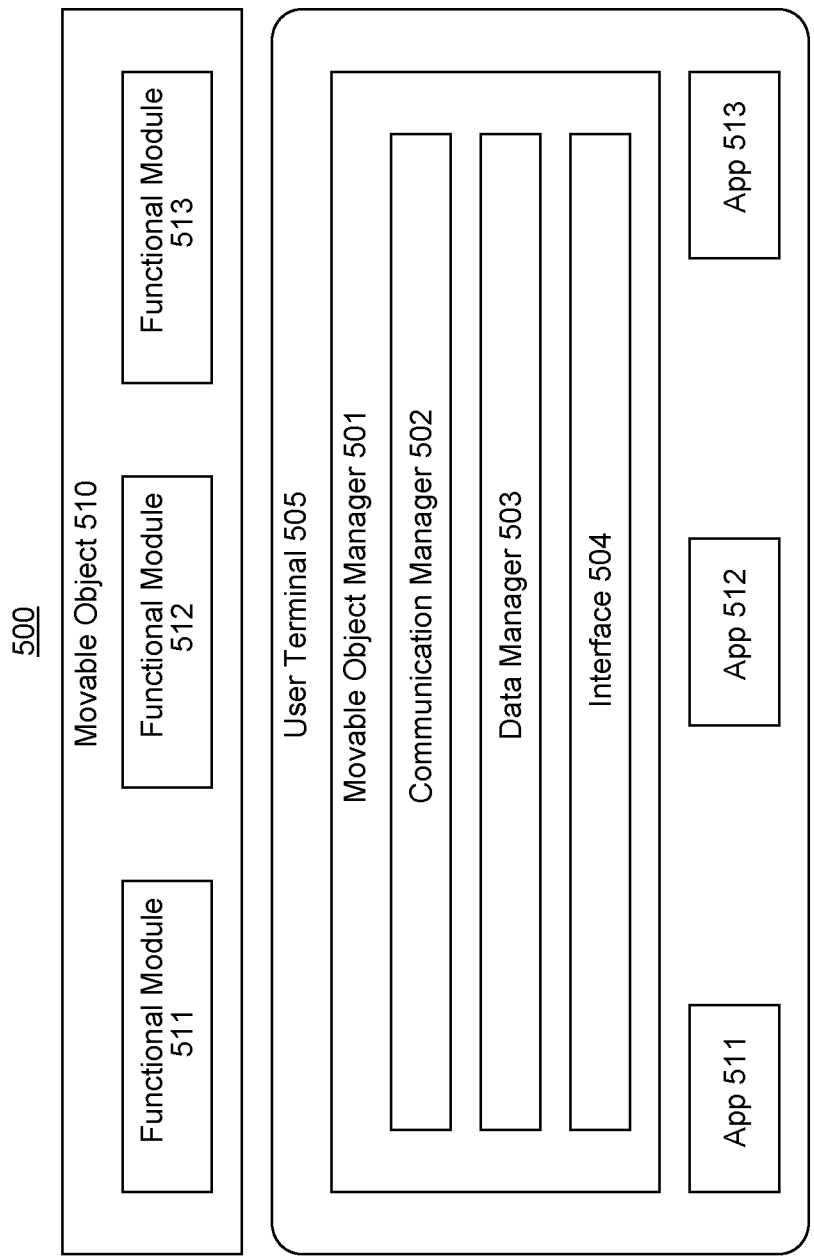
FIG. 5 is an exemplary illustration of a movable object manager in a movable object environment, in accordance with various embodiments of the present invention.

FIG. 5 is an exemplary illustration of a movable object manager in a movable object environment, in accordance with various embodiments of the present invention. As shown in FIG. 5, a movable object manager 501 can be used for accessing and controlling a movable object 510, which can include various functional modules 511-513.

For example, the movable object manager 501 can be deployed on a user terminal 505 along with the applications, e.g. APPs 511-513. Alternatively, the movable object manager 510 can be deployed on a separate server or a communication device, from where the application can obtain the access to the movable object 501. Also, the movable object manager 502 may be deployed directly on the movable object 510.

The movable object manager 501 can include a communication manager 502, a data manager 503, and an interface 504. The communication manager 502 can be used for handling one or more data packets that are associated with a communication protocol. The data manager 503 can be used for managing the data exchange between the applications and the movable object 510. Additionally, the movable object manager 501 can provide an interface 504, which is accessible by the applications 511-513 in the movable object environment 500.

Figure 6:
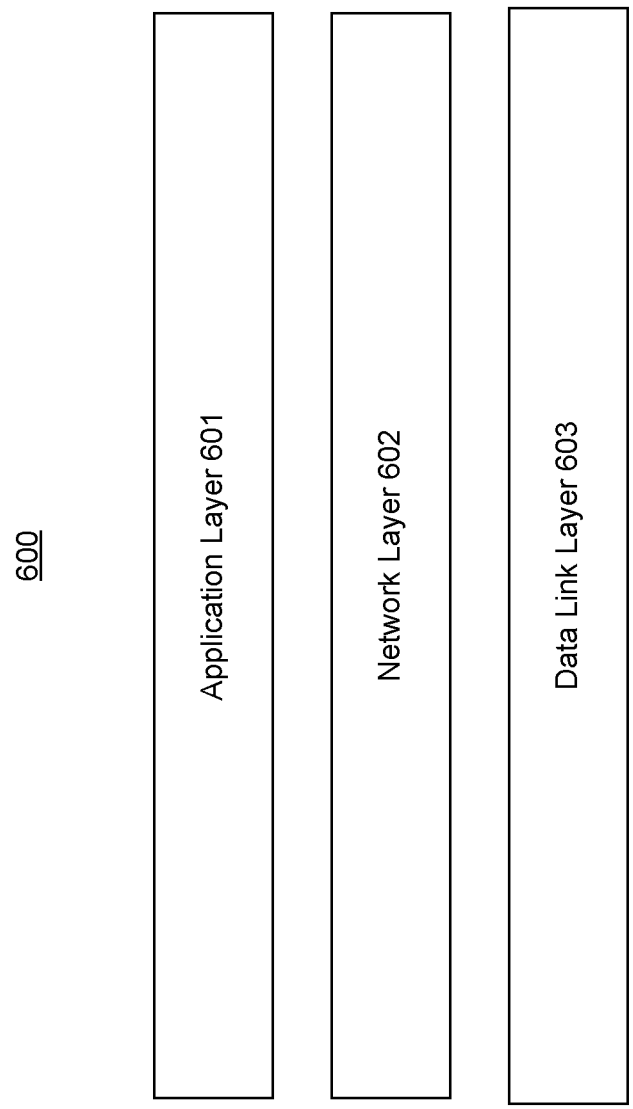
FIG. 6 is an exemplary illustration of an abstraction of a communication protocol in a movable object environment, in accordance with various embodiments of the present invention.

FIG. 6 is an exemplary illustration of an abstraction of a communication protocol in a movable object environment, in accordance with various embodiments of the present invention. As shown in FIG. 6, the communication protocol 600 can include a data link layer 603, a network layer 602, and an application layer 601.

The data link layer 603 can be responsible for handling data framing, data check, and data retransmission. The network layer 602 can be responsible for supporting data packets routing and relaying. The application layer 601 can be responsible for handling various application logics, such as controlling the behavior of various functional modules in a movable object.

In accordance with various embodiments of the present invention, the communication protocol 600 can support the communication between various modules within a movable object, such as a flight image system, which can include a camera, a flight remote control, a gimbal, a digital media processor, and a circuit board.

Furthermore, the communication protocol 600 can be used with different physical link technologies, such as the universal asynchronous receiver/transmitter (UART) technology, the controller area network (CAN) technology, and the inter-integrated circuit (I2C) technology.

Figure 7:
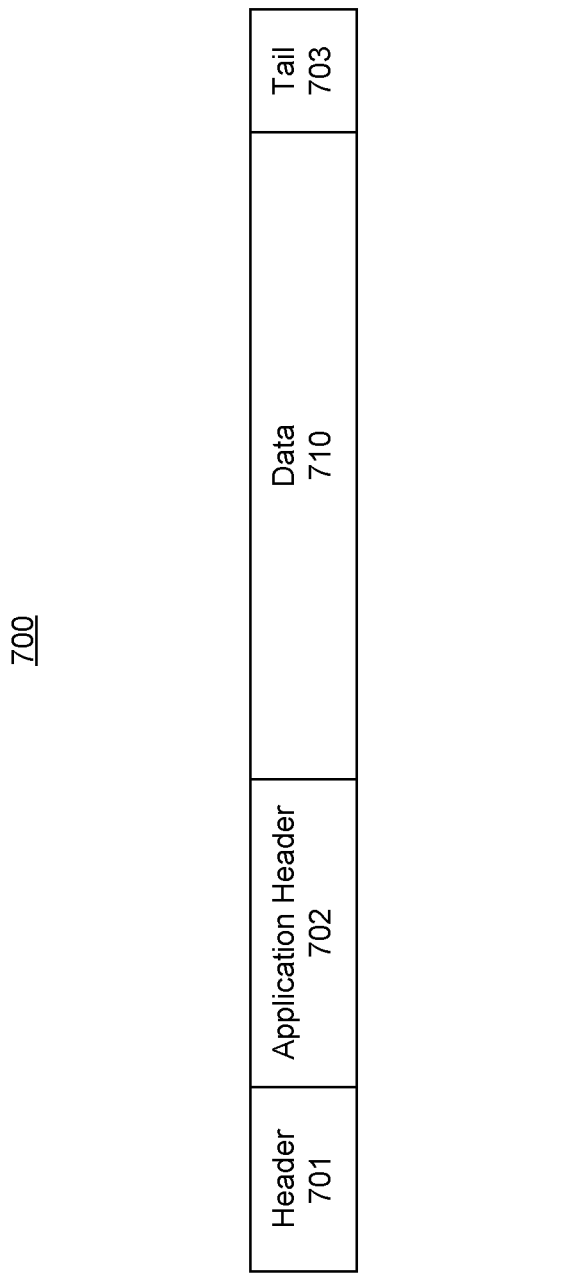
FIG. 7 is an exemplary illustration of a packet format in a movable object application environment, in accordance with various embodiments of the present invention.

FIG. 7 is an exemplary illustration of a packet format in a movable object application environment, in accordance with various embodiments of the present invention. As shown in FIG. 7, a packet 700 can include a header 701, an application header 702, data 710, and a tail 703.

The header 701 and the tail 703 can include the control information that the network needs for delivering the user data. For example, the control information can include the source and the destination network addresses, the error detection codes, and the sequencing information.

The application header 702 can include various sender and receiver information. For example, the sender and receiver can be among the different modules in the movable object and the applications on the user terminal.

Figure 8:
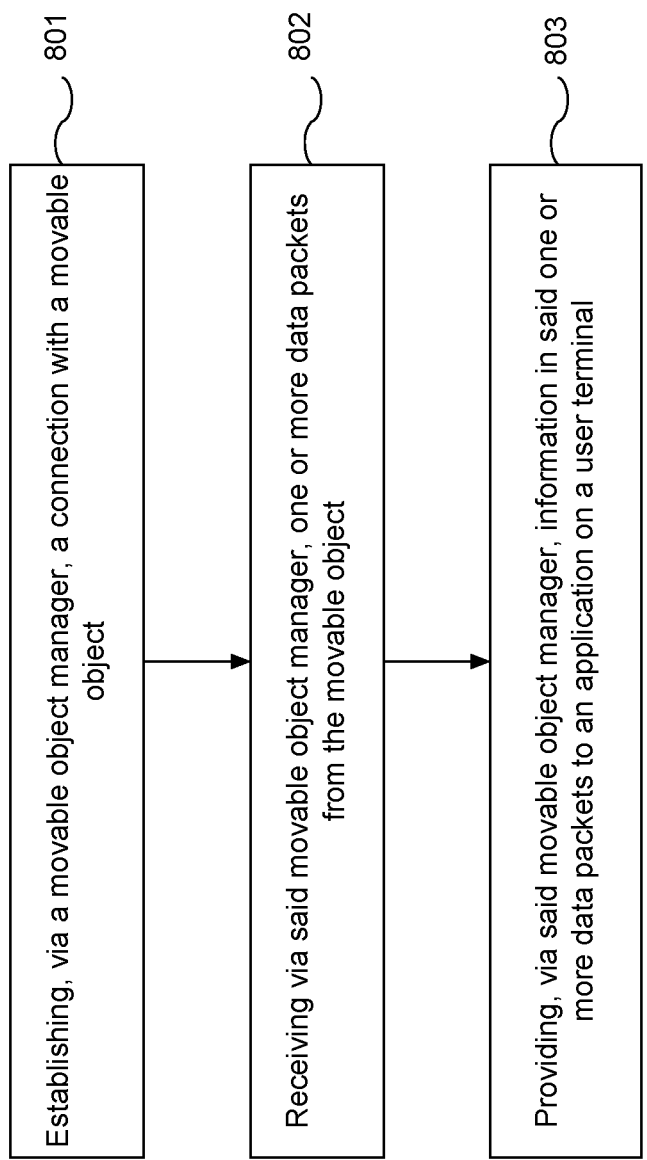
FIG. 8 shows a flowchart of using a movable object manager to support a movable object application, in accordance with various embodiments of the present invention.

FIG. 8 shows a flowchart of using a movable object manager to support a movable object application, in accordance with various embodiments of the present invention. As shown in FIG. 8, at step 801, a movable object manager can establish a connection with a movable object. Then, at step 802, the movable object manager can receive one or more data packets from the movable object. Furthermore, at step 803, the movable object manager can provide information in said one or more data packets to an application on a user terminal.

A Movable Object Interface

Figure 9:
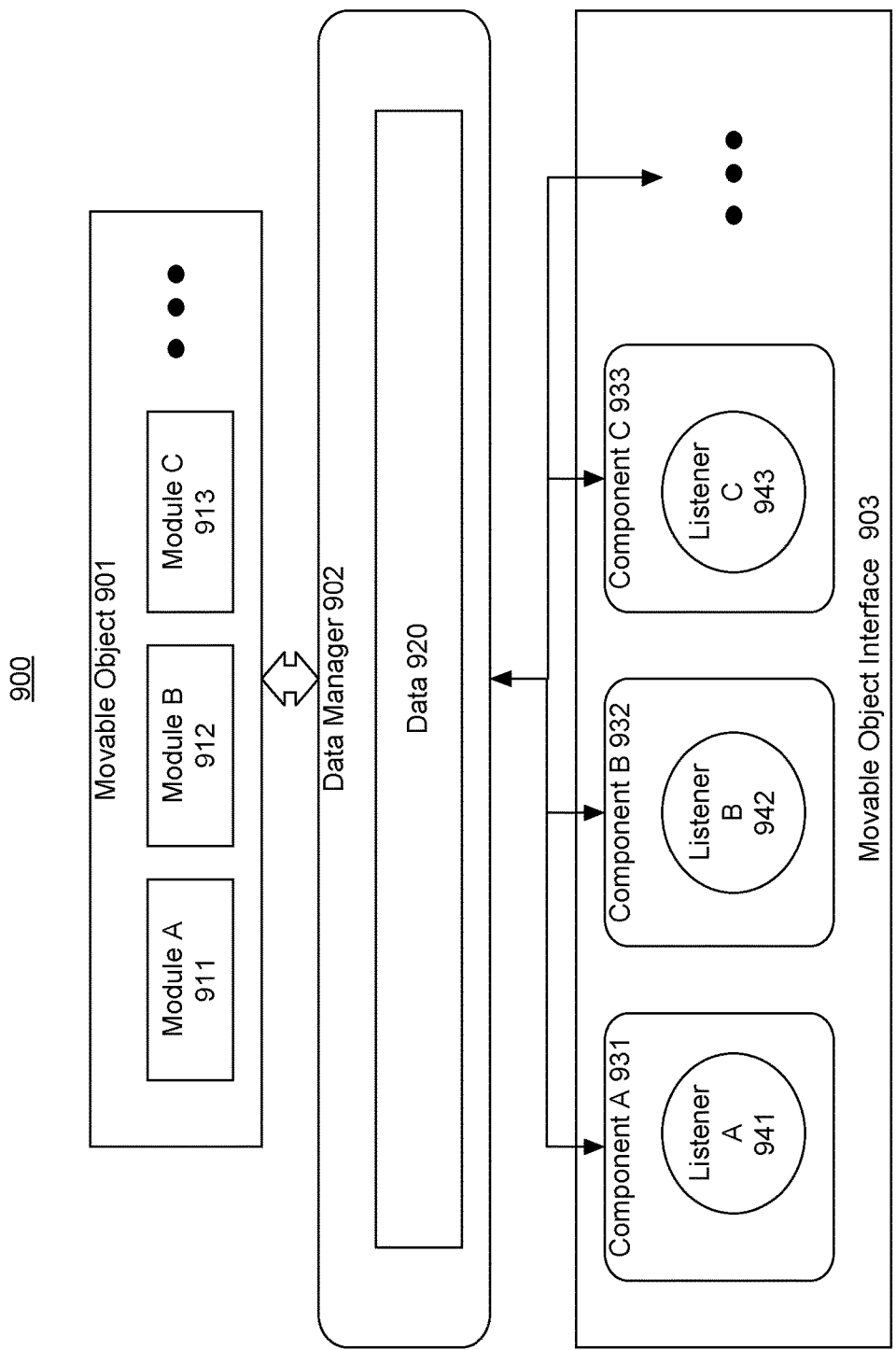
FIG. 9 is an exemplary illustration of supporting a movable object interface in a software development environment, in accordance with various embodiments of the present invention.

FIG. 9 is an exemplary illustration of supporting a movable object interface in a software development environment, in accordance with various embodiments of the present invention. As shown in FIG. 9, a movable object interface 903 can be used for providing access to a movable object 901 in a software development environment 900, such as a software development kit (SDK) environment.

Furthermore, the movable object 901 can include various functional modules A-C 911-913, and the movable object interface 903 can include different interfacing components A-C 931-933. Each said interfacing component A-C 931-933 in the movable object interface 903 can represent a module A-C 911-913 in the movable object 901.

In accordance with various embodiments of the present invention, the movable object interface 903 can provide one or more callback functions for supporting a distributed computing model between the application and movable object 901.

The callback functions can be used by an application for confirming whether the movable object 901 has received the commands. Also, the callback functions can be used by an application for receiving the execution results. Thus, the application and the movable object 901 can interact even though they are separated in space and in logic.

As shown in FIG. 9, the interfacing components A-C 931-933 can be associated with the listeners A-C 941-943. A listener A-C 941-943 can inform an interfacing component A-C 931-933 to use a corresponding callback function to receive information from the related module(s).

Additionally, a data manager 902, which prepares data 920 for the movable object interface 903, can decouple and package the related functionalities of the movable object 901. Also, the data manager 903 can be used for managing the data exchange between the applications and the movable object 901. Thus, the application developer does not need to be involved in the complex data exchanging process.

For example, the DJI SDK can provide a series of callback functions for communicating instance messages and for receiving the execution results from an unmanned aircraft. The DJI SDK can configure the life cycle for the DJI callback functions in order to make sure that the information interchange is stable and completed. For example, the DJI SDK can establish connection between an unmanned aircraft and an application on a smart phone (e.g. using an Android system or an iOS system). Following the life cycle of a smart phone system, the DJI callback functions, such as the ones receiving information from the unmanned aircraft, can take advantage of the patterns in the smart phone system and update the statements accordingly to the different stages in the life cycle of the smart phone system.

Figure 10:
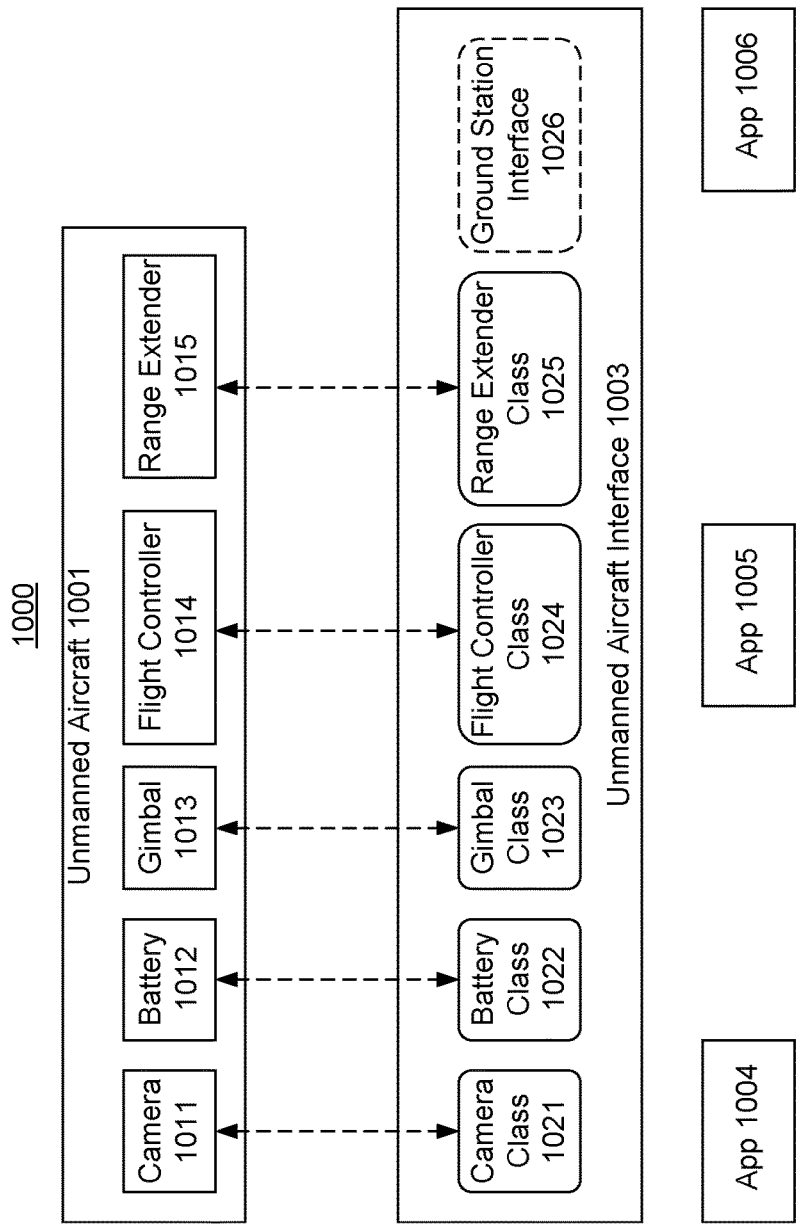
FIG. 10 is an exemplary illustration of an unmanned aircraft interface, in accordance with various embodiments of the present invention.

FIG. 10 is an exemplary illustration of an unmanned aircraft interface, in accordance with various embodiments of the present invention. As shown in FIG. 10, an unmanned aircraft interface 1003 can represent an unmanned aircraft 1001. Thus, the applications, e.g. APPs 1004-1006, in the unmanned aircraft environment 1000 can access and control the unmanned aircraft 1001.

For example, the unmanned aircraft 1001 can include various modules, such as a camera 1011, a battery 1012, a gimbal 1013, a flight controller 1014, and a range extender 1015.

Correspondently, the movable object interface 1003 can include a camera component 1021, a battery component 1022, a gimbal component 1023, a flight controller component 1024 and a range extender component 1025.

Additionally, the movable object interface 1003 can include a ground station component 1026, which is associated with the flight controller component 1024. The ground station component operates to perform one or more flight control operations, which may require a high level privilege.

Figure 11:
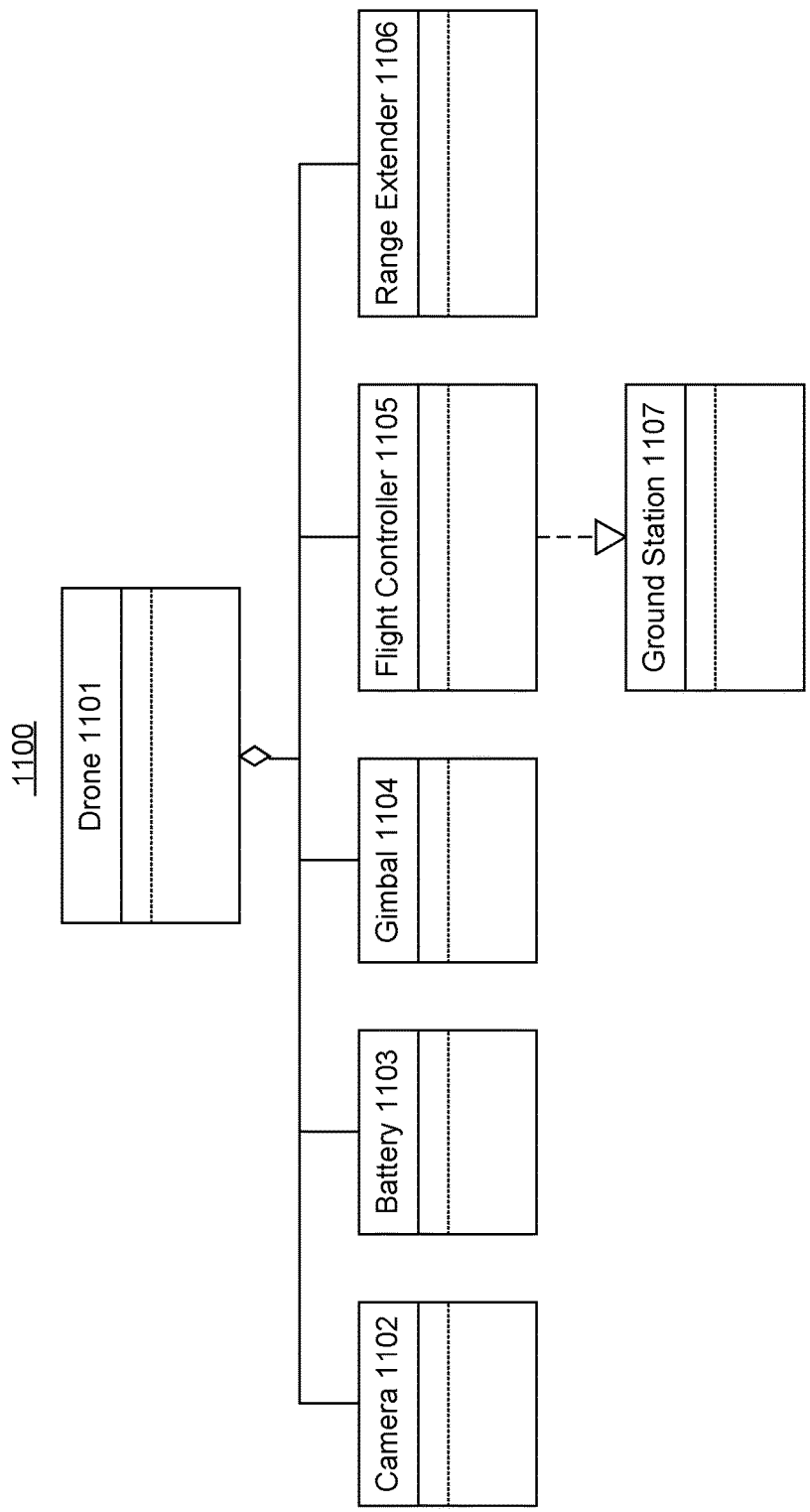
FIG. 11 is an exemplary illustration of the components for an unmanned aircraft in a software development kit (SDK), in accordance with various embodiments of the present invention.

FIG. 11 is an exemplary illustration of the components for an unmanned aircraft in a software development kit (SDK), in accordance with various embodiments of the present invention. As shown in FIG. 11, the drone class 1101 in the SDK 1100 is an aggregation of other components 1102-1107 for an unmanned aircraft (or a drone). The drone class 1101, which have access to the other components 1102-1107, can interchange information with the other components 1102-1107 and controls the other components 1102-1107.

In accordance with various embodiments of the present invention, an application may be accessible to only one instance of the drone class 1101. Alternatively, multiple instances of the drone class 1101 can present in an application.

In DJI SDK, an application can connect to the instance of the drone class 1101 in order to upload the controlling commands to the unmanned aircraft. For example, an appropriate place in the DJI SDK for establishing the connection to the unmanned aircraft is the OnCreate( )method in the MainActivity class. Also, the DJI SDK can disconnect the connection to the unmanned aircraft in the OnDestory( ) method in the MainActivity class. After connecting to the unmanned aircraft, the developer can have access to the other classes (e.g. the camera class 1102 and the gimbal class 1104). Then, the drone class 1101 can be used for invoking the specific functions, e.g. the camera functions and the gimbal functions, to control the behavior of the unmanned aircraft.

In accordance with various embodiments of the present invention, an application can use a battery class 1103 for controlling the power source of an unmanned aircraft. Also, the application can use the battery class 1103 for planning and testing the schedule for various flight tasks.

As battery is one of the most restricted elements in an unmanned aircraft, the application may seriously consider the status of battery not only for the safety of the unmanned aircraft but also for making sure that the unmanned aircraft can finish the designated tasks. For example, the battery class 1103 can be configured such that if the battery level is low, the unmanned aircraft can terminate the tasks and goes home outright.

Using the DJI SDK, the application can obtain the current status and information of the battery by invoking the get( ) function in the DJI Drone Battery Class. Also, the application can use the set( ) functions for controlling the frequency of the feedbacks.

In accordance with various embodiments of the present invention, an application can use a camera class 1102 for defining various operations on the camera in a movable object, such as an unmanned aircraft. For example, in DJI SDK, the DJI Camera Class includes functions for receiving media data in SDcard, getting & setting photo parameters, taking photo and recording videos.

An application can use the camera class 1102 for modifying the setting of photos and records. For example, the developer can use setCameraPhotoSize( ) method for adjusting the size of photos taken. Also, an application can use a media class for maintaining the photos and records.

In accordance with various embodiments of the present invention, an application can use a gimbal class 1104 for controlling the view of the unmanned aircraft. For example, the DJI Gimbal Class can be used for configuring an actual view, e.g. setting a first personal view of the unmanned aircraft. Also, the DJI Gimbal Class can be used for automatically stabilizing the gimbal, in order to be focused on one direction. Also, the application can use the DJI Gimbal Class to change the angle of view for detecting different objects.

In accordance with various embodiments of the present invention, an application can use a flight controller class 1105 for providing various flight control information and status about the unmanned aircraft.

Using the DJI Main Controller Class, an application can monitor the flight status, e.g. using instant messages. For example, the callback function in the DJI Main Controller Class can send back the instant message every one thousand milliseconds (1000 ms).

Furthermore, the DJI Main Controller Class allows a user of the application to investigate the instance message received from the unmanned aircraft. For example, the pilots can analyze the data for each flight in order to further improve their flying skills.

In accordance with various embodiments of the present invention, an application can use a ground station class 1107 to perform a series of operations for controlling the unmanned aircraft.

For example, the DJI SDK may require application to have a SDK-LEVEL-2 key for using the DJI Ground Station Class. The DJI Ground Station Class can provide one-key-fly, on-key-go-home, manually controlling the drone by app (i.e. joystick mode), setting up a cruise and/or waypoints, and various other task scheduling functionalities.

In accordance with various embodiments of the present invention, an application can use a communication component, such as a range extender class 1106, for establishing the network connection between the application and the unmanned aircraft.

Figure 12:
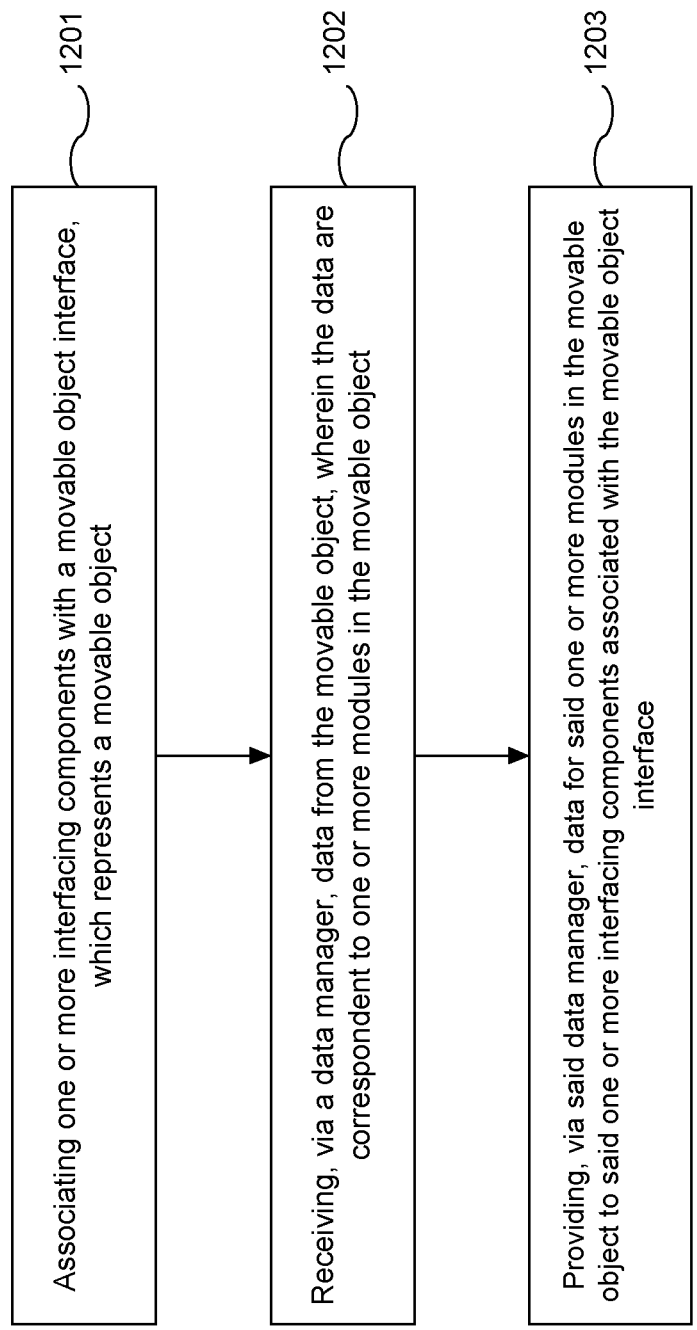
FIG. 12 shows a flowchart of supporting a movable object interface in a software development environment, in accordance with various embodiments of the present invention.

FIG. 12 shows a flowchart of supporting a movable object interface in a software development environment, in accordance with various embodiments of the present invention. As shown in FIG. 12, at step 1201, the system can associate one or more interfacing components with a movable object interface, which represents a movable object. Then, at step 1202, a data manager can receive data from the movable object, wherein the data are correspondent to one or more modules in the movable object. Furthermore, at step 1203, the data manager can provide data for said one or more modules in the movable object to said one or more interfacing components associated with the movable object interface.

Using an Authentication Server for Supporting a Security Model

Figure 13:
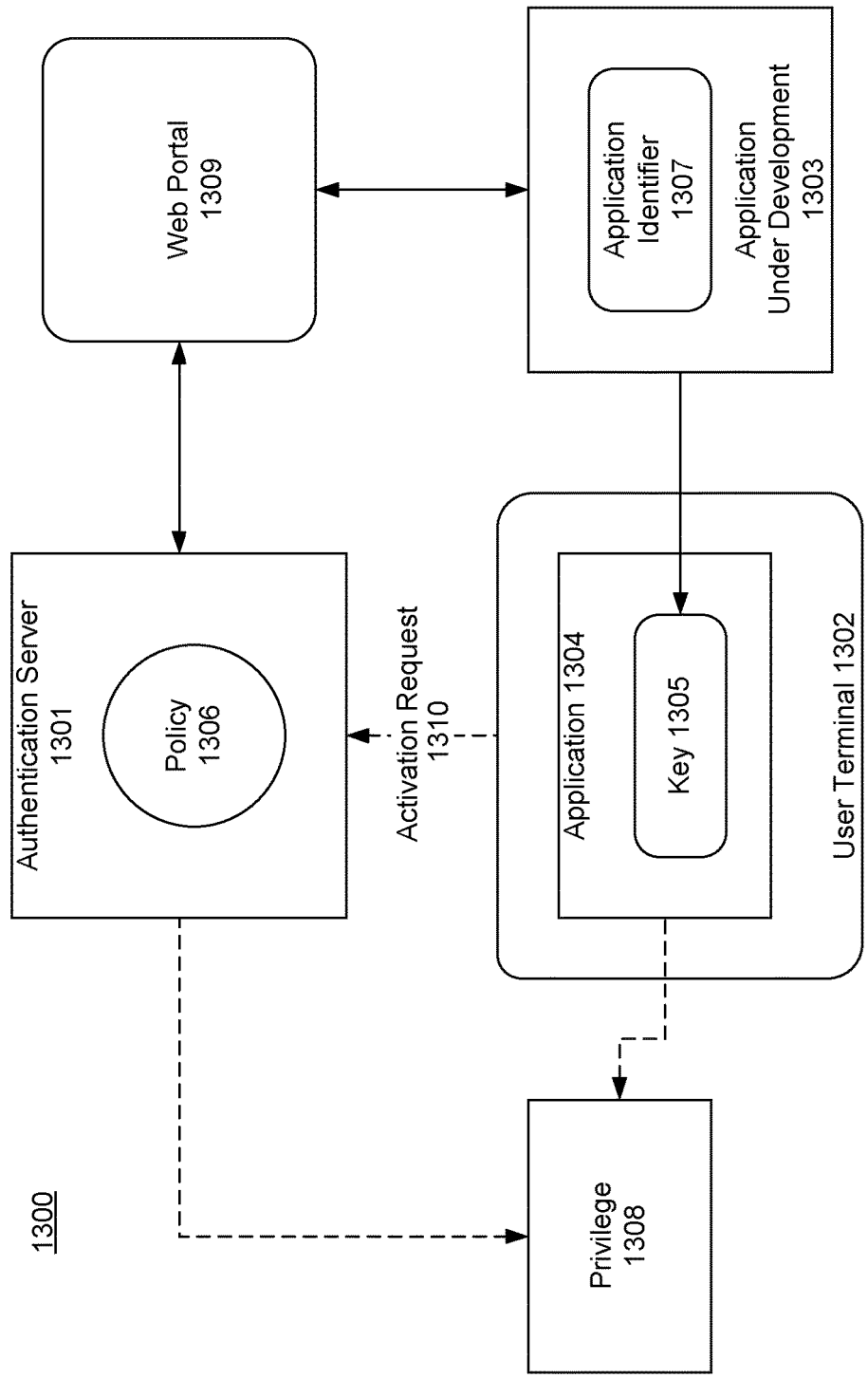
FIG. 13 is an exemplary illustration of using an authentication server for supporting a security model in a movable object environment, in accordance with various embodiments of the present invention.

FIG. 13 is an exemplary illustration of using an authentication server for supporting a security model in a movable object environment, in accordance with various embodiments of the present invention. As shown in FIG. 13, an authentication server 1301 can be used in an application development environment 1300 for supporting a security model.

An application development environment can create (or associate) an application identifier 1307 for an application under development 1303. For example, the application identifier 1307 can be the package name in the Android system, or the bundle name in the iOS system.

As shown in FIG. 13, a developer can submit the application identifier 1307 to a web portal 1309, which can direct such information to the authentication server 1301. Thus, the authentication server 1301 can assign an application key 1305 to the application under development 1303 based on an application identifier 1307 that is associated with the application under development 1303.

Then, the application 1304 can be deployed on a user terminal 1302 with the application key 1305. In accordance with various embodiments of the present invention, the application key 1305 binds uniquely with the application identifier 1307, and wherein each application key is associated with a set of privileges.

As shown in FIG. 13, the authentication server 1301 in an application development environment 1300 can receive an activation request 1310 from an application 1304. For example, the activation request 1310 may include an application key 1305.

In accordance with various embodiments of the present invention, the activation request can be a request for a privilege 1308 to access a movable object. For example, the movable object can be an unmanned aircraft, an unmanned vehicle, a hand-held device, or a robot.

As shown in FIG. 13, the authentication server 1301 can apply one or more policies 1306 on the activation request 1310, in order to determine whether the application 1304 should be granted with the privilege 1308 for accessing the movable object. The policies can be defined using different criteria, such as a maximum installation number, and/or different roles of the application.

In accordance with various embodiments of the present invention, the authentication server 1301 can make the decision based on the application key 1305, which is contained in the activation request 1310. For example, each different application key may be associated with different set of privileges.

As shown in FIG. 13, the authentication server 1301 can grant the privilege 1308, to access the movable object, to the application 1304, if the application 1304 is entitled to the privilege 1308.

Figure 14:
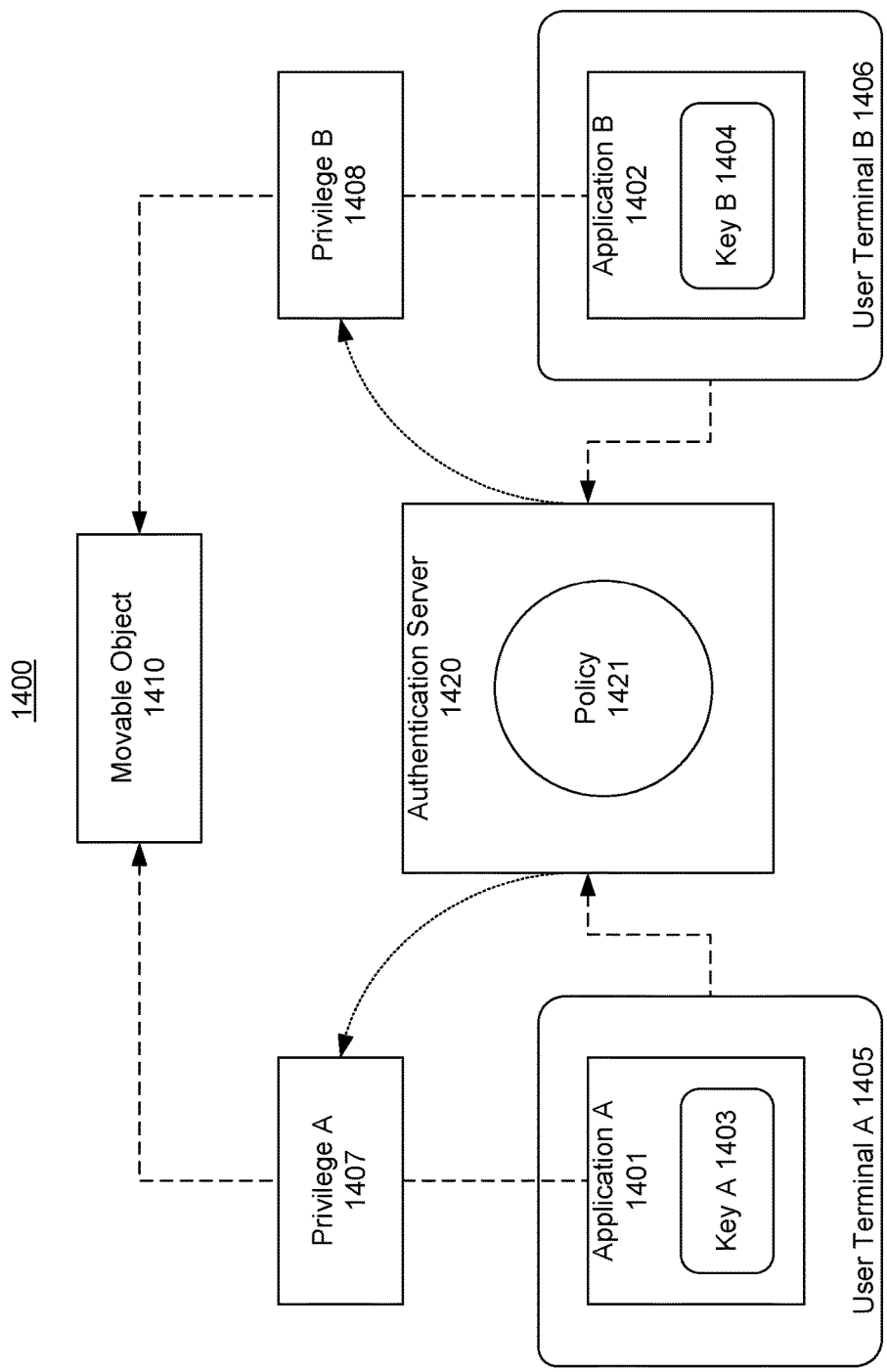
FIG. 14 is an exemplary illustration of using an authentication server for supporting multiple applications in a movable object environment, in accordance with various embodiments of the present invention.

FIG. 14 is an exemplary illustration of using an authentication server for supporting multiple applications in a movable object environment, in accordance with various embodiments of the present invention. As shown in FIG. 14, an authentication server 1420 in a movable object environment 1400 can be used for handling the activation requests from different applications A-B 1401-1402, for accessing and controlling a movable object 1410, based on one or more policies 1421.

For example, the application A 1401, which is assigned with an application key A 1403, can be associated with a set of privileges, e.g. the privilege A 1407. On the other hand, the application B 1401, which is assigned with an application key B 1404, can be associated with a different set of privileges, e.g. the privilege B 1408.

In accordance with various embodiments of the present invention, the software development kit (SDK) can include a security mechanism, which includes a low level functionality, which is available to all registered developers, and a high level functionality, which is available only to the proved developers. In order to obtain the high level privilege, an applicant may need to go through an approval process, which involves the real name registration and intentional usage statement.

Figure 15:
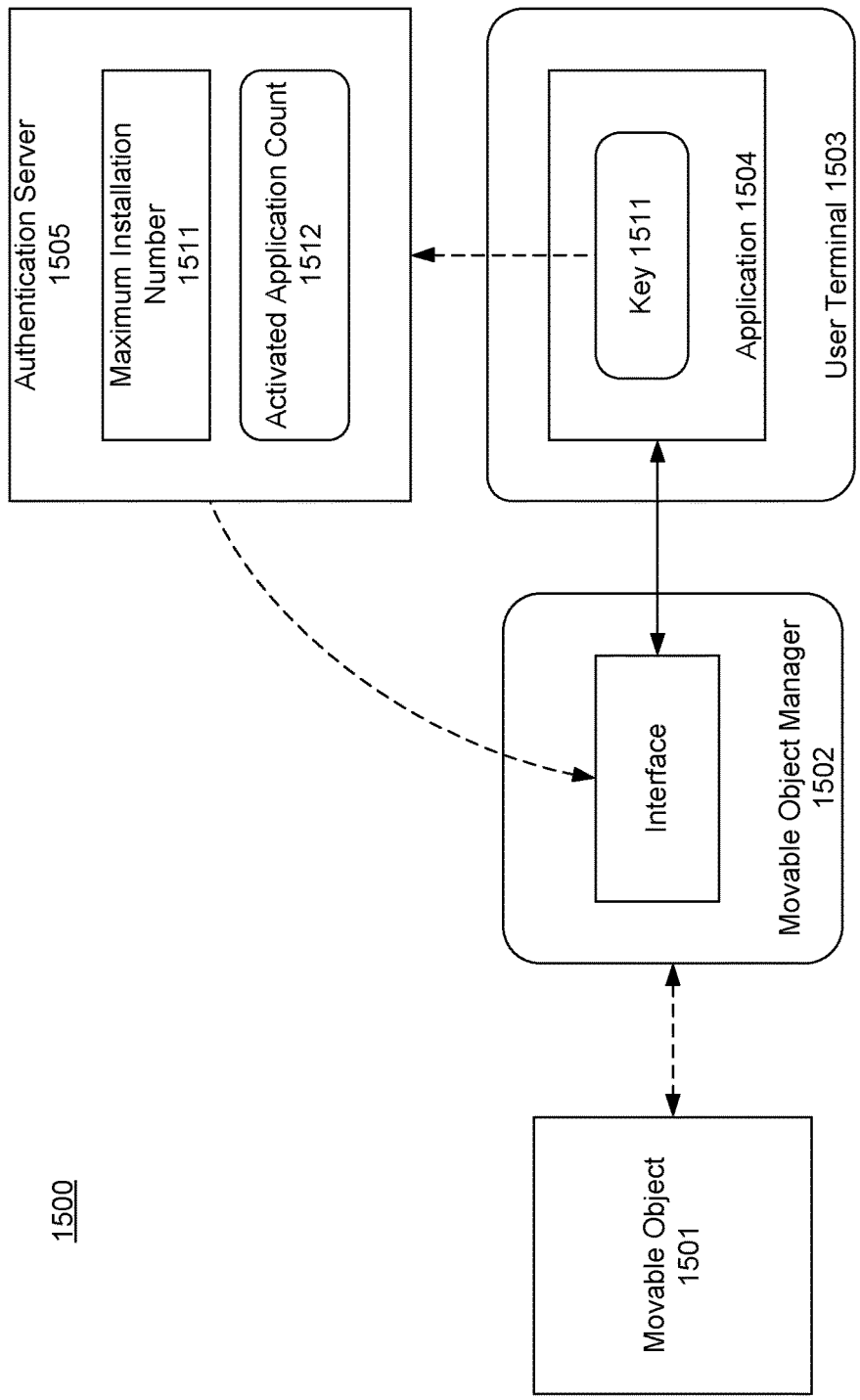
FIG. 15 is an exemplary illustration of supporting a security model in a movable object environment, in accordance with various embodiments of the present invention.

FIG. 15 is an exemplary illustration of supporting a security model in a movable object environment, in accordance with various embodiments of the present invention. As shown in FIG. 15, an authentication server 1505 in an application development environment 1500, e.g. a software development kit (SDK), can receive an activation request 1510 from an application 1504 for accessing and controlling a movable object 1501.

The authentication server can maintain a maximum installation number 1511, which can be preconfigured or configured dynamically. Then, the authentication server 1505 can update an activated application count 1502 once an application 1504 is activated.

In accordance with various embodiments of the present invention, the authentication server 1505 may deny the activation request if the activated application count 1512 is equal to or more than the maximum installation number 1511.

Furthermore, the authentication server 1505 can increase the maximum installation number 1511 in order to handle an upgrade request; or setting the maximum installation number to zero to stop the illegal or inappropriate applications.

As shown in FIG. 15, the authentication server 1505 allows the application to use an interface 1510 for accessing the movable object 1501. For example, the movable object 1501 can be an unmanned aircraft, the interface 1510 of which includes a camera component, a battery component, a gimbal component a communication component, and a flight controller component. Additionally, the interface 1510 may include a ground station component, which is associated with the flight controller component, wherein said ground station component operates to perform one or more flight control operations, which is configured to be only accessible by an application with a particular set of privileges.

At the beginning stage of the application development, the SDK may only approve a small number of applications, in order to safeguard the application development. After the developer finishing the development, the SDK can check the requirement documents, technique documents, installation documents, and related source codes in an approval process. After finishing the approval process, the SDK can increase the maximum installation number 1511 in order to upgrade the application.

In accordance with various embodiments of the present invention, the activation process based on the maximum installation number 1511 can be used to prevent the malicious application or inappropriate application.

For example, the system can set the maximum installation number 1511 to zero in order to prevent the activation of malicious applications. Additionally, the system can deactivate the application, such as preventing the malicious applications from accessing the SDK.

Figure 16:
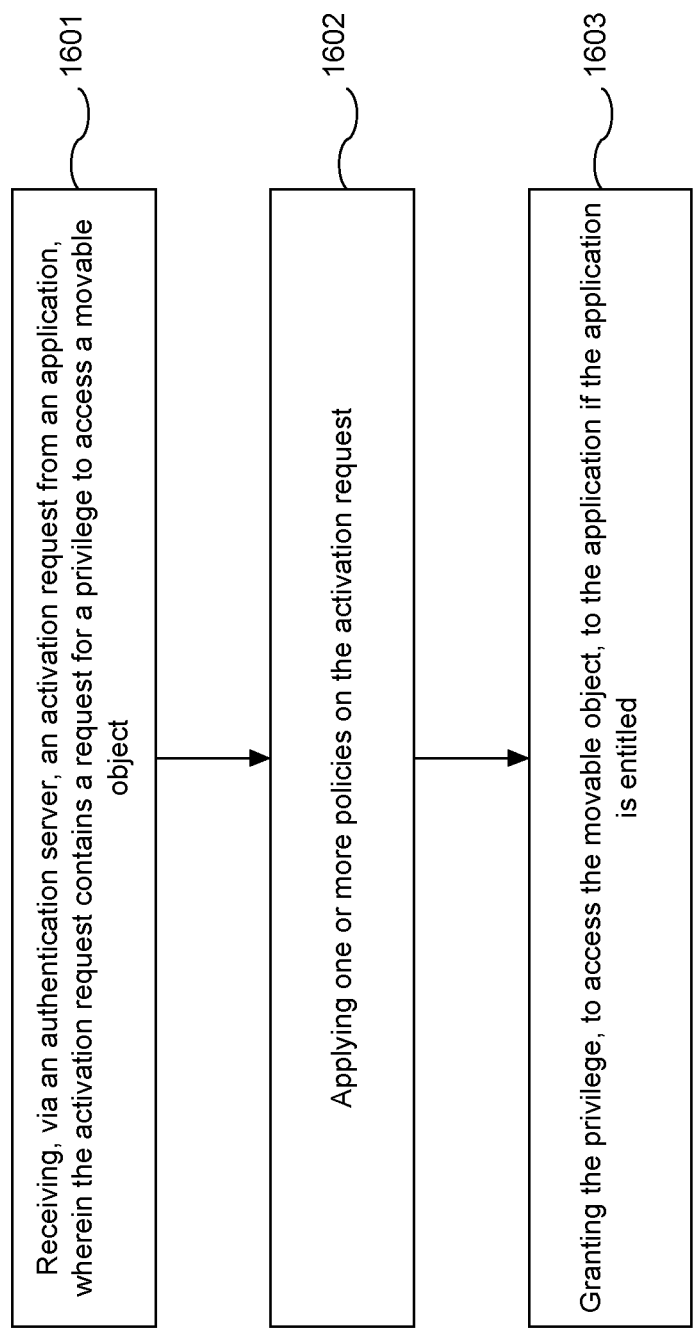
FIG. 16 shows a flowchart of supporting a security model in a movable object environment, in accordance with various embodiments of the present invention.

FIG. 16 shows a flowchart of supporting a security model in a movable object environment, in accordance with various embodiments of the present invention. As shown in FIG. 16, at step 1601, an authentication server can receive an activation request from an application, wherein the activation request contains a request for a privilege to access a movable object. Furthermore, at step 1602, the authentication server can apply one or more policies on the activation request. Then, at step 1603, the authentication server can granting the privilege, to access the movable object, to the application if the application is entitled.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting application development in a movable object environment, comprising:
   establishing, via a movable object manager, a connection with a movable object configured to process commands for controlling at least one hardware module on the movable object;
   receiving, via said movable object manager, one or more data packets from the movable object, wherein the data packets include information corresponding to the at least one hardware module on the movable object;
   providing, via said movable object manager, the information in said one or more data packets to an application on a user terminal; and
   providing, via said movable object manager, one or more commands from the application to the movable object, wherein the commands include information corresponding to the at least one hardware module on the movable object.

2. The method of claim 1, wherein:
   the movable object is a unmanned aircraft, a unmanned vehicle, a hand-held device, or a robot.

3. The method of claim 1, further comprising:
receiving, via said movable object manager, one or more commands from the application; and
sending, via said movable object manager, the one or more commands to the movable object.

4. The method of claim 1, further comprising:
using a communication device to receive said one or more data packets from the movable object.

5. The method of claim 4, wherein:
the communication device operates to communicate with the movable object via multiple links, wherein each said link is used to transmit a different type of data packets.

6. The method of claim 4, wherein:
the communication device operates to communicate with the movable object via a link, which is used to transmit mixed types of data packets.

7. The method of claim 1, further comprising:
using a communication manager to handle a communication protocol associated with said one or more data packets.

8. The method of claim 1, further comprising:
using a data manager to distribute information received from the movable object to the application on the user terminal.

9. The method of claim 1, wherein said movable object manager is accessible by one or more applications via an interface.

10. The method of claim 9, further comprising:
associating the interface with one or more interfacing components, wherein each said interfacing component represents a module in a movable object.

11. The method of claim 10, further comprising:
associating each said interfacing component with a listener, which allows the interfacing component to receive information that relates to the module represented.

12. The method of claim 9, wherein:
the movable object is an unmanned aircraft;
the at least one hardware module includes a camera, a battery, a gimbal, a communication device, and a flight controller; and
the interface includes a camera component, a battery component, a gimbal component, a communication component, and a flight controller component.

13. The method of claim 12, wherein:
the interface includes a ground station component, which is associated with the flight controller component, wherein said ground station component operates to perform one or more flight control operations.

14. The method of claim 1, further comprising:
using an authentication server to authenticate the application before allowing the application to communicate with the movable object, wherein the authentication server is associated with a software development kit.

15. The method of claim 1, wherein:
the method is implemented as a part of a software development kit.

16. The method of claim 1, wherein:
the user terminal includes a plurality of applications including the application to which the information in said one or more data packets is provided,
the one or more data packets received from the movable object further including information corresponding to the application; and
providing, via said movable object manager, the information in said one or more data packets to the application further comprises using the information corresponding to the application.

17. The method of claim 1, wherein:
the application has an associated privilege; and
the method further comprises verifying the associated privilege before providing, via the movable object manager, the information in said one or more data packets to the application.

18. The method of claim 17, wherein:
an external authentication server grants the associated privilege to the application.

19. The method of claim 1, wherein:
the application has an associated privilege; and
the method further comprises verifying the associated privilege before providing, via the movable object manager, the one or more commands from the application to the movable object.

20. The method of claim 19, wherein:
an external authentication server grants the associated privilege to the application.

21. A system for supporting application development in a movable object environment, comprising:
one or more microprocessors;
a movable object manager, running on the one or more microprocessors, wherein the movable object manager operates to
establish a connection with a movable object configured to process commands for controlling at least one hardware module on the movable object;
receive one or more data packets from the movable object, wherein the data packets include information corresponding to the at least one hardware module on the movable object;
provide the information in said one or more data packets to an application on a user terminal; and
providing one or more commands from the application to the movable object, wherein the commands include information corresponding to the at least one hardware module on the movable object.

22. The system of claim 21, wherein:
the movable object is a unmanned aircraft, a unmanned vehicle, a hand-held device, or a robot.

23. The system of claim 21, wherein:
said movable object manager operates to:
receive one or more commands from the application; and
send the one or more commands to the movable object.

24. The system of claim 21, further comprising:
a communication device that operates to receive said one or more data packets from the movable object.

25. The system of claim 24, wherein:
the communication device operates to communicate with the movable object via multiple links, wherein each said link is used to transmit a different type of data packets.

26. The system of claim 24, wherein:
the communication device operates to communicate with the movable object via a link, which is used to transmit mixed types of data packets.

27. The system of claim 21, wherein:
the movable object manager operates to use a communication manger to handle a communication protocol associated with said one or more data packets.

28. The system of claim 21, wherein:
the movable object manager operates to use a data manager to distribute information received from the movable object to the application on the user terminal.

29. The system of claim 21, wherein:
said movable object manager is accessible by one or more applications via an interface.

30. The system of claim 29, wherein:
the interface is associated with one or more interfacing components, wherein each said interfacing component represents a module in the movable object.

31. The system of claim 30, wherein:
each said interfacing component is associated with a listener, which allows the interfacing component to receive information that relates to the represented module.

32. The system of claim 29, wherein:
the movable object is an unmanned aircraft;
the at least one hardware module includes a camera, a battery, a gimbal, a communication device, and a flight controller; and
the interface includes a camera component, a battery component, a gimbal component a communication component, and a flight controller component.

33. The system of claim 32, wherein:
the interface includes a ground station component, which is associated with the flight controller component, wherein said ground station component operates to perform one or more flight control operations.

34. The system of claim 21, further comprising:
an authentication server that operates to authenticate the application before allowing the application to communicate with the movable object, wherein the authentication server is associated with a software development kit.

35. A non-transitory computer-readable medium with instructions stored thereon, that when executed by a processor, perform the steps comprising:

establishing, via a movable object manager, a connection with a movable object configured to process commands for controlling at least one hardware module on the movable object;

receiving, via said movable object manager, one or more data packets from the movable object, wherein the data packets include information corresponding to the at least one hardware module on the movable object;

providing, via said movable object manager, the information in said one or more data packets to an the application on a user terminal; and providing, via said movable object manager, one or more commands from the application to the movable object, wherein the commands include information corresponding to the at least one hardware module on the movable object.

36. A system for supporting application development in a movable object environment, comprising:
one or more microprocessors;
a movable object manager, running on the one or more microprocessors, wherein the movable object manager operates to
  establish a connection with a movable object configured to process commands for controlling at least one hardware module on the movable object;
  receive one or more data packets from the movable object, wherein the data packets include information corresponding to the at least one hardware module on the movable object;
  provide the information in said one or more data packets to an application on a user terminal; and
  providing one or more commands from the application to the movable object, wherein the commands include information corresponding to the at least one hardware module on the movable object.

* * * * *